United States Patent [19]

Kloker et al.

[11] Patent Number: 4,742,479

[45] Date of Patent: May 3, 1988

[54] MODULO ARITHMETIC UNIT HAVING ARBITRARY OFFSET AND MODULO VALUES

[75] Inventors: Kevin L. Kloker, Arlington Heights; Miles P. Posen, Chicago, both of Ill.

[73] Assignee: Motorola, Inc., Schaumburg, Ill.

[21] Appl. No.: 715,864

[22] Filed: Mar. 25, 1985

[51] Int. Cl.[4] ............................................. G06F 7/72
[52] U.S. Cl. ................................................. 364/746
[58] Field of Search ......................................... 364/746

[56] References Cited

U.S. PATENT DOCUMENTS

| | | | |
|---|---|---|---|
| 3,980,874 | 9/1976 | Vora | 364/746 |
| 4,187,549 | 2/1980 | Bond et al. | 364/746 |
| 4,598,266 | 7/1986 | Bernardson | 364/746 |

OTHER PUBLICATIONS

"DSP Microprocessor ADSP-2100" Analog Devices Inc., Aug. 1986, pp. 1-35.
Roesgen et al., "Moving Memory Off Chip, DSP μP Squeezes in More Computational Power" *Electronic Design*, Feb. 20, 1986, pp. 131-140.
Garde et al., "16-Bit-Slice Family Creates Ultrafast Digital Signal Processors" *Electronic Design*, May 17, 1984, pp. 136-144.
Raminarayar, "Practical Realisation of Mod p,p Prime Multiplier" *Electronics Letters*, Jun. 5, 1980, vol. 16, No. 2, pp. 466-467.

*Primary Examiner*—David M. Malzahn
*Attorney, Agent, or Firm*—John A. Fisher; Jeffrey Van Myers; Robert L. King

[57] ABSTRACT

A modulo arithmetic unit for providing a sum or difference of two numbers of arbitrary value in a selected one of a plurality of moduli is provided. Each modulus has a lower and an upper boundary and a range of intermediate values. First and second adders are provided for respectively providing first and second outputs which respectively represent outputs compensated for and not compensated for a possible wraparound of the upper or lower boundary. Control circuitry is used to detect whether a wraparound occurred during the calculation depending upon the value of selective interstage carry signals of the first and second adders. The correct output is provided as a selected one of the outputs of the first and second adders in response to the control circuitry.

14 Claims, 2 Drawing Sheets

MODULO ARITHMETIC UNIT HAVING ARBITRARY OFFSET AND MODULO VALUES

CROSS REFERENCE TO RELATED APPLICATIONS

Related subject matter can be found in the following copending applications, each of which is assigned to the assignee hereof:

1. Application Ser. No. 06/715,863, entitled, "A Data Processor Execution Unit", filed simultaneously herewith by Kevin Kloker.
2. Application Ser. No. 06/715,865, entitled, "Method And Apparatus for Implementing Modulo Arithmetic Calculations", filed simultaneously herewith by Tim Williams.

TECHNICAL FIELD

This invention relates generally to modulo arithmetic, and more particularly, to an arithmetic unit (AU) for implementing modulo arithmetic with arbitrary modulo and offset values.

BACKGROUND ART

Data calculations in electronic circuits are commonly implemented by modulo arithmetic. In an abstract mathematical sense, "modulo M" arithmetic uses a number system to the base M where each digit of the number system is represented by a predetermined value within a range from 0 thru (M−1), where M is an integer. A representation of "(N)modulo M" is essentially equal to the "remainder" of N to the base M. For example, the representation (12) modulo 10 is equal to two. As calculations of (R±N)modulo M are performed on numbers R and N which each are within a range from 0 thru (M−1), the resultant must also be a number within the defined range. If a lower boundary value, L, of the range is not equal to zero, a modulo value resulting from an arithmetic calculation is no longer literally equal to a remainder value. The resultant is offset from 0 by the value of the lower boundary L and the modulo arithmetic calculation becomes equal to:

[(R±N−L)modulo M]+L.

Modulo arithmetic is commonly used in signal processing and data processors to perform address calculations. The address calculations are performed on integer values to access data in data storage devices. Data storage devices are typically implemented by conventional memory circuits having linear addressing capability. Linear arithmetic is an arithmetic form commonly found in data processors and is typically implemented by conventional two's complement binary arithmetic. However, linear arithmetic does not directly implement data structures in memory, such as circular buffers, queues or FIFOs. This is because linear arithmetic provides no capability of performing a "wraparound" operation to maintain an address within a defined range. In contrast, modulo arithmetic directly implements these types of data structures in conventional memory circuits by providing a wraparound operation with no overhead. Therefore, it is often desirable to use modulo addressing to create these useful data structures.

Modulo addressing is typically implemented with software using linear arithmetic. Typical microprocessors use linear addressing to implement modulo addressing. A circular buffer or a queue is typically implemented by incrementing an address pointer by an offset value and using a comparator for comparing each successive increment value with a first boundary value. When the first boundary value is reached, a second boundary value representing the wraparound value is provided so that the resultant remains within a predetermined range. This type of addressing is also known in the literature as "circular buffer addressing", "queue addressing" and "FIFO addressing". However, implementation of modulo addressing using linear arithmetic typically requires a minimum of four software instructions per data access. Therefore, a large amount of overhead exists when frequently accessing such data structures.

SUMMARY OF THE INVENTION

Accordingly, an object of the present invention is to provide an improved modulo arithmetic unit (AU) having arbitrary offset and modulo values.

Another object of the present invention is to provide an improved electronic circuit for implementing modulo arithmetic with arbitrary offset and modulo values and which minimizes the amount of circuitry required.

Yet another object of the present invention is to provide an improved modulo AU for effecting modulo arithmetic having improved speed characteristics.

In carrying out these and other objects of the present invention, there is provided, in one form, a modulo M arithmetic unit for providing the sum or difference of first and second numbers. The first number must have a numerical value falling within a predetermined range having an upper and a lower boundary relative to M, where M is a selected one of a plurality of predetermined moduli. The second number must have an absolute value less than or equal to the modulus M. A first adder selectively receives the first and second numbers and adds or subtracts the second number in response to an arithmetic operational control signal. The first adder provides a rank ordered plurality of first carry bits and a rank ordered plurality of first output bits, the first output bits representing the arithmetic sum or difference of the first and second numbers regardless of whether the output value representation is within the range of values as defined by the modulus. Therefore, the first output bits represent the resultant assuming no modulo wraparound occurred. A first modulo controller is coupled to the first adder and provide a first carry control bit in response to both the first carry bits and a plurality of modulus control bits. The bits of the selected modulus M are decoded to provide the modulus control bits. A second adder selectively receives the first output bits and the bits of the modulus M and adds or subtracts the modulo bits to or from the first output bits in response to the sign of the second number and the arithmetic operational control signal. The second adder provides a rank ordered plurality of second carry bits and a rank ordered plurality of second output bits, said second output bits representing the arithmetic sum or difference of the first and second numbers assuming a module wraparound occurred. A second modulo controller is coupled to the second adder for providing a second carry control bit in response to both the second carry bits and the plurality of the modulus control bits. A multiplexed controller is coupled to the first and second adders and to the first and second modulo controllers, for selectively providing one of the pluralities of first and second output bits in response to the first and second carry control bits and the sign of the second number. The above and other objects, features and advantages will be more clearly understood from the following detailed description taken in conjunction with the accompanying drawings.

DETAILED DESCRIPTION OF THE INVENTION

Figure 1:
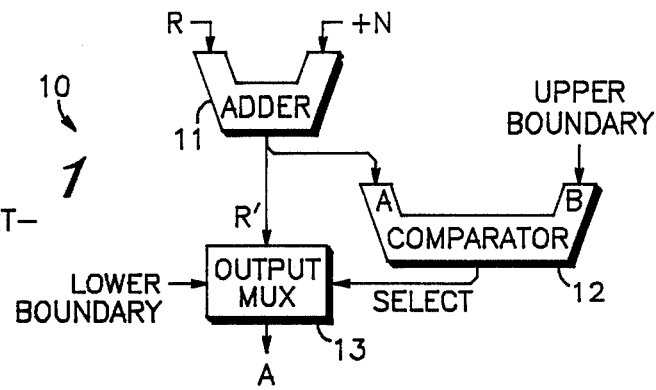
FIG. 1 illustrates in block diagram form a modulo arithmetic circuit known in the art.

Shown in FIG. 1 is a modulo arithmetic unit 10 known in the art for implementing the mathematical calculation (R+N)modulo M. An adder 11 has a first input for receiving the number R and a second input for receiving the number N. A sum output of adder 11 is connected to both a first input of a comparator 12 and to a first input of an output multiplexer circuit 13. A predetermined upper boundary of the modulus M is coupled to a second input of comparator 12, and a predetermined lower boundary of the modulus M is coupled to a second input of output multiplexer 13. An output of comparator 12 is connected to a control input of output multiplexer 13. An output of multiplexer 13 provides an output value A which is equal to the value of (R+N)modulo M.

In operation, the number R may represent an input data value and N may represent an update value which is added to R. The output value of adder 11, labeled "R'", represents the correct value of the sum provided the sum did not cross or wraparound the predetermined upper boundary of the modulus. Therefore, in order to determine whether wraparound occurred, comparator 12 compares the sum value with the predetermined upper boundary to determine whether or not a crossing of the upper boundary occurred. From an electronic hardware standpoint, circuitry for determining whether the sum remained inside the allowed modulo range is required. If comparator 12 determines that the sum value is outside the range of the modulus, then an output select control signal is provided for forcing output multiplexer 13 to substitute the lower boundary value as the output sum A rather than outputting a sum value which is outside the range of the modulus.

A disadvantage with modulo arithmetic unit 10 is the fact that a plurality of storage registers which are not illustrated are required for storing the upper and lower boundary values. As a result, when numerous modulo ranges are defined, a large amount of additional storage circuitry is required. Additionally, a more serious disadvantage of unit 10 is the fact that unit 10 is limited to being incremented by only the value of one. In other words, in order for the output value A of unit 10 to be correct, the value of offset N must always be equal to one. This limitation on the value of N is caused by the fact that output multiplexer 13 may only substitute a single value when an overflow detection is made by comparator 12. When the offset or amount of increase in a modulo arithmetic unit is restricted to the value of one, flexibility of modulo addressing and other applications is severely limited. Further, in order to decrement as well as increment, additional logic is required to switch the positions where the upper and lower boundary values are coupled to unit 10. Therefore, modulo arithmetic unit 10 cannot provide arbitrary offset and modulo values.

Figure 2:
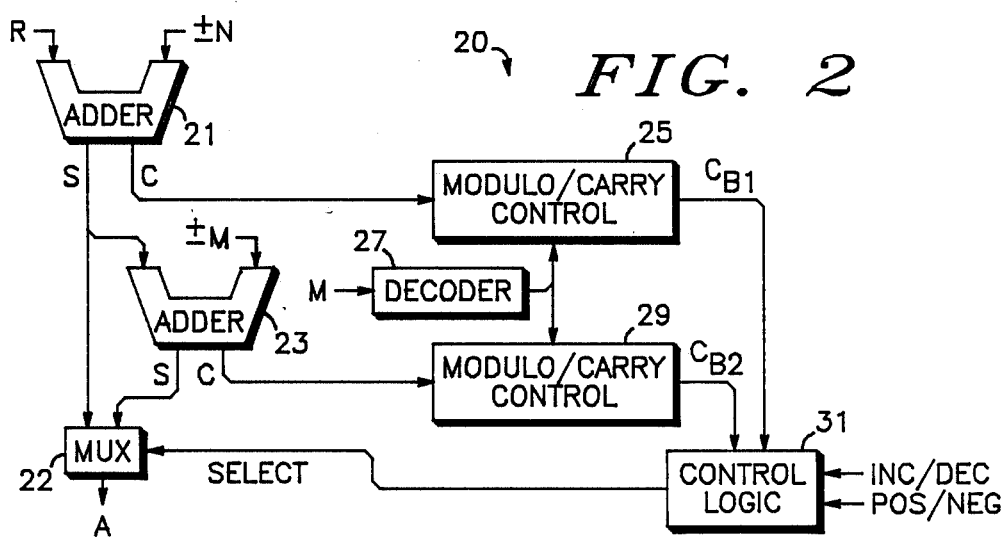
FIG. 2 illustrates in block diagram form, one embodiment of a modulo arithmetic circuit in accordance with the present invention.

Shown in FIG. 2 is a modulo arithmetic unit for effecting the operation (R±N)modulo M and which provides modulo arithmetic operations with arbitrary offset and modulo values. An n-bit adder circuit 21, where n is an integer, has a first input labeled "R", a second input labeled "±N", a first output labeled "S" and a second output labeled "C". The first output of adder 21 is connected to both a first input of a multiplexer circuit 22 and a first input of an n-bit adder circuit 23. A second input of adder circuit 23 is connected to a binary number labeled "±M" which represents the modulus. A first output of adder circuit 23 labeled "S" is connected to a second input of multiplexer circuit 22, and a second output of adder circuit 23 is labeled "C". The second output of adder circuit 21 is connected to a first input of a modulo/carry control circuit 25. The second output of adder circuit 23 is connected to a first input of a modulo/carry control circuit 29. The binary representation of the modulus, M, is coupled to an input of a modulo decoder circuit 27. An output of decoder circuit 27 is connected to both a second input of modulo/carry control circuit 25 and a second input of a modulo/carry control circuit 29. An output of modulo/carry control circuit 25 labeled "$C_{B1}$" is connected to a first input of a control logic circuit 31. An output of modulo/carry control circuit 29 labeled "$C_{B2}$" is connected to a second input of control logic circuit 31. An increment/decrement control signal labeled "Inc/Dec" is connected to a third input of control logic circuit 31, and a positive/negative control signal labeled "POS/NEG" is connected to a fourth input of control logic circuit 31. An output of control logic circuit 31 is connected to a third input of multiplexer circuit 22. An output of multiplexer circuit 22 provides a resultant labeled "A" which is equal to (R±N)modulo M.

In operation, modulo arithmetic unit 20 calculates the value (R±N)modulo M where R, N and M are arbitrarily selected values and may vary. The only restriction on the value of N is that the absolute value of N must be less than or equal to M. However, this limitation will later be shown to not be limiting as a practical matter. As previously mentioned, in modulo M arithmetic, addition and subtraction operations are performed over a fixed range of values varying from a lower to an upper boundary. The modulus is defined as the difference between the upper and lower boundaries plus one. Adder 21 functions to calculate the arithmetic value of either (R+N) or (R−N) in linear arithmetic. The result provided by adder 21 is the proper output value of unit 20 assuming the value of (R+N) or (R−N) does not cause a wraparound at an upper or a lower boundary. Adder 23 functions by assuming a wraparound exists and calculates the value of either [(R+N) −M] or [(R−N)+M] by further subtracting or adding the modulus, respectively. The remaining circuitry of modulo unit 20 functions to determine whether or not a wraparound of a boundary did occur based upon predetermined interstage carry bits generated by both adders 21 and 23 and to output a correct one of first and second calculated inputs of multiplexer 22.

In the illustrated form, the predetermined modulo places a restriction on the permissible values of the lower boundary of the modulo range. The lower boundary of the modulo range must have all zeros in the k LSBs, where k is an integer, and $2^k$ must be greater than or equal to the modulus M. Therefore, the lower boundary must be equal to $X2^k$, where X is a nonnegative integer. If the lower boundary is not zero, the $2^k$ LSBs of the lower boundary are equal to zero and the $2^k$ LSBs of the upper boundary are equal to (M−1). The remaining MSBs of the n-bit number are arbitrary and provide a plurality of modulo ranges for each predetermined modulo value M. By making the lower boundary have a value which is a multiple of a power of two, a decision on when a boundary is crossed may be easily made by decoding the least significant carry bits. It should be apparent that the present invention may also be practiced using non-binary arithmetic such as binary coded decimal (BCD), etc. For non-binary arithmetic applications, the base of the lower boundary defined as a multiple of a power of two above will vary accordingly. Using a known value for each lower boundary, an additional comparision of each calculated value with a stored lower boundary value is avoided. Therefore, modulo arithmetic with arbitrary offset and modulo, values may be performed without requiring storage devices for upper and lower boundary values.

As a result of the defined lower boundary value, the selection of the correct output A of the two outputs provided by adders 21 and 23 follows a simple set of rules. If the number R is being incremented by a positive N, no wraparound of the upper boundary occurs if the k LSBs of the output (R+N) from adder 21 does not overflow in a positive direction and the k LSBs of the output (R+N−M) from adder 23 overflows in a negative direction. A wraparound of the upper boundary occurs if the k LSBs of the output (R+N) from adder 21 overflow in a positive direction or the k LSBs of the output (R+N−M) from adder 23 does not underflow in a negative direction. A determination of this condition can be readily made by examining the carry bits of the k LSBs of adders 21 and 23. The same rule applies for wraparound of the upper boundary if the number R is being decremented by a negative N.

Similarly, if the number R is being decremented by a positive N, no wraparound of the lower boundary occurs if the k LSBs of the output (R−N) from adder 21 does not overflow in a negative direction. A wraparound of the lower boundary occurs if the k LSBs of the output (R−N) from adder 21 overflows in a negative direction. The same rule applies for wraparound of the lower boundary if the number R is being incremented by a negative N. It should be noted that a carry-out bit of adder 23 is not required to detect a wraparound of a lower boundary. Overflows in a positive direction may be detected by the presence of a carry output bit and overflows in a negative direction may be detected by the absence of a carry output bit which is indicative of a borrow.

Figure 3:
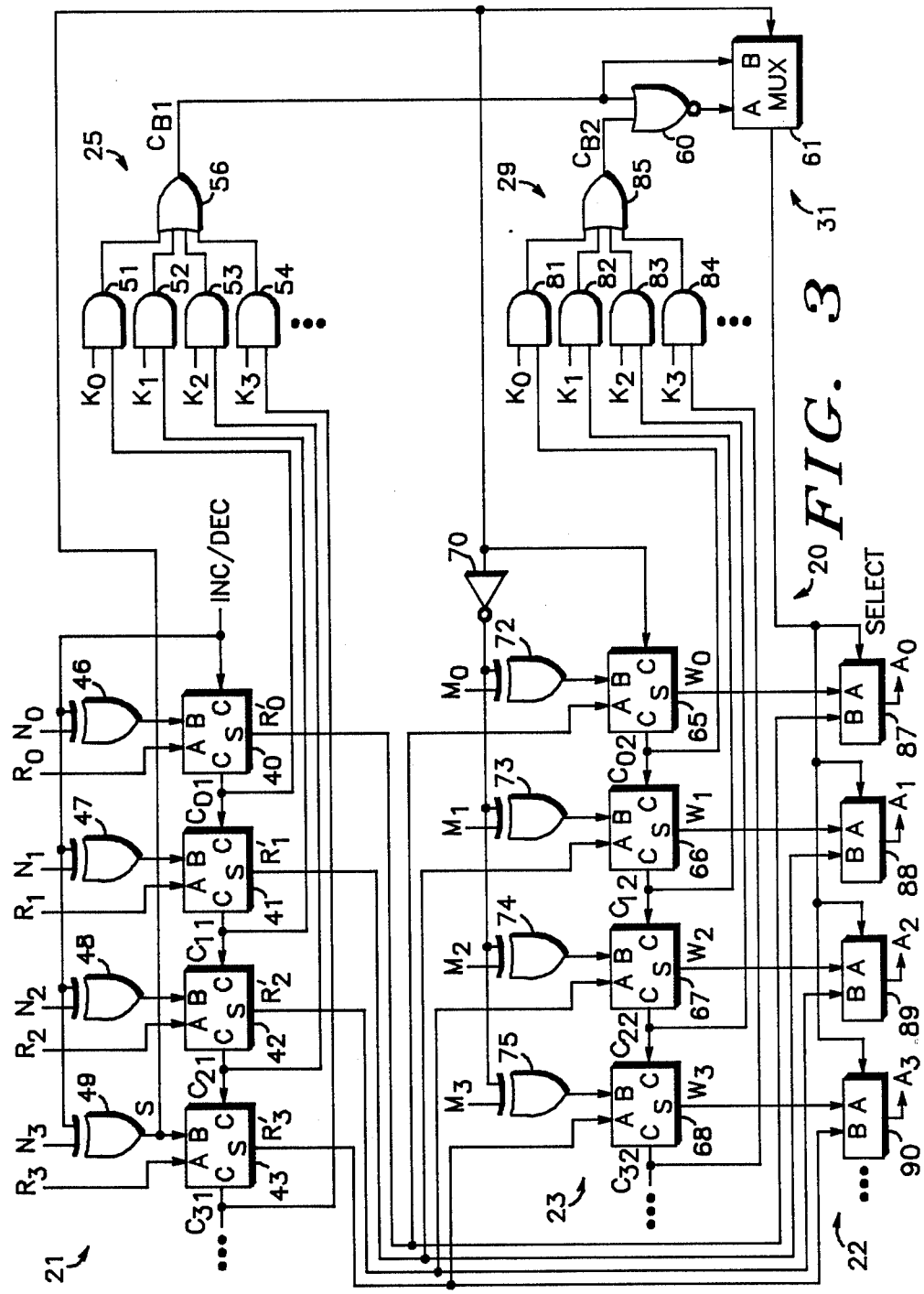
FIG. 3 illustrates in partial schematic form the modulo arithmetic circuit of FIG. 2.

Shown in FIG. 3 is a specific four bit implementation of modulo arithmetic unit 20 of FIG. 2 for further illustrating the principles of the present invention. The present invention may be practised with any number of full adder circuits representing any bit size as indicated by the dots of FIG. 3. However, for the purpose of illustration, a representative number of moduli may be discussed in the context of four full adders. Adder circuit 21 comprises a plurality of four rank ordered full adder circuits 40, 41, 42 and 43. Full adder 40 is the least significant adder circuit of adder 21. An increment/decrement control signal, INC/DEC, is coupled to a carry input terminal of full adder circuit 40 and to each of first inputs of a plurality of exclusive OR gates 46, 47, 48 and 49. A predetermined one of the four least significant bits of an input number R labeled $R_0$, $R_1$, $R_2$ and $R_3$ is connected to a first input labeled "A" of full adders 40, 41, 42 and 43, respectively. Bit $R_0$ is the least significant bit of input number R. A predetermined one of four bits of an input offset number N labeled $N_0$, $N_1$, $N_2$ and $N_3$ is connected to a second input of exclusive OR gates 46, 47, 48 and 49. Bit $N_0$ is the least significant bit of input number N. A predetermined output of each of exclusive OR gates 46, 47, 48 and 49 is connected to a second input labeled "B" of full adders 40, 41, 42 and 43, respectively. The output of exclusive OR gate 49 is a sign bit of number N, $N_3$, exclusive ORed with the INC/DEC control signal and is labeled "S". Signal S indicates whether the upper or the lower boundary value is being approached.

Modulo/carry control portion 25 comprises AND gates 51, 52, 53 and 54 and an OR gate 56. A carry output of full adder 40 labeled "C01" is connected to both a carry input of full adder 41 and to a first input of AND gate 51 of modulo control circuit 25. A carry output of full adder 41 labeled "C11" is connected to both a carry input of full adder 42 and to a first input of AND gate 52. A carry output of full adder 42 labeled "C21" is connected to both a carry input of full adder 43 and to a first input of AND gate 53. A carry output of full adder 43 labeled "C31" is connected to a first input of AND gate 54. A predetermined one of a plurality of encoded control signals labeled $K_0$, $K_1$, $K_2$ and $K_3$ is connected to a second input of AND gates 51, 52, 53 and 54, respectively. Each of AND gates 51, 52, 53 and 54 has an output connected to a predetermined one of a plurality of inputs of OR gate 56. AND gates 51, 52, 53, 54 and OR gate 56 generally comprise modulo control circuit 25 of FIG. 2. OR gate 56 provides the output control signal labeled "$C_{B1}$" which is connected to both a first input of a NOR gate 60 and a first input labeled "B" of a multiplexer circuit 61 of control logic circuit 31.

Adder circuit 23 comprises a plurality of four full adders 65, 66, 67 and 68. Full adder 65 is the least significant adder circuit of adder 23. The sign bit S is connected to an input of an inverter circuit 70 and to a carry input of full adder 65. An output of inverter 70 is connected to a first input of a plurality of exclusive OR gates 72, 73, 74 and 75. Each of exclusive OR gates 72, 73, 74 and 75 has a second input connected to a respective one of modulus bits $M_0$, $M_1$, $M_2$ and $M_3$. Bit $M_0$ is the least significant bit of input number M. A first input of full adder 65 is connected to an output of full adder 40 labeled "$R'_0$", and a second input of full adder 65 is connected to an output of exclusive OR gate 72. A first input of full adder 66 is connected to an output of full adder 41 labeled "$R'_1$", and a second input of full adder 66 is connected to an output of exclusive OR gate 73. A first input of full adder 67 is connected to an output of full adder 42 labeled "$R'_2$", and a second input of full adder 67 is connected to an output of exclusive OR gate 74. A first input of full adder 68 is connected to an output of full adder 43 labeled "$R'_3$", and a second input of full adder 68 is connected to an output of exclusive OR gate 75. A carry output of full adder 65 labeled "$C_{02}$" is connected to both a carry input of full adder 66 and to a first input of an AND gate 81. A carry output of full adder 66 labeled "$C_{12}$" is connected to both a carry input of full adder 67 and to a first input of an AND gate 82. A carry output of full adder 67 labeled "$C_{22}$" is connected to both a carry input of full adder 68 and to a first input of an AND gate 83. A carry output of full adder 68 labeled "$C_{32}$" is connected to a first input of an AND gate 84. Each of AND gates 81, 82, 83 and 84 has a second input coupled to a respective one of a plurality of the encoded control signals $K_0$, $K_1$, $K_2$ and $K_3$. Each of AND gates 81, 82, 83 and 84 has an output connected to a respective input of an OR gate 85. AND gates 81–84 and OR gate 85 generally comprise modulo control circuit 29 of FIG. 2. An output of OR gate 85 provides a carry control signal labeled "$C_{B2}$" and is connected to a second input of NOR gate 60. An output of NOR gate 60 is connected to a second input of multiplexer circuit 61 labeled "A".

Multiplexer circuit 22 generally comprises a plurality of rank ordered multiplexers 87, 88, 89 and 90. Each output of full adders 65, 66, 67 and 68 is respectively connected to a predetermined first input of multiplexers 87, 88, 89 and 90. Each output of full adders 40, 41, 42 and 43 is respectively connected to a predetermined second input of multiplexers 87, 88, 89 and 90. Multiplexer circuit 61 provides an output signal which is connected to a third input of each of multiplexers 87, 88, 89 and 90. An output of each of multiplexers 87, 88, 89 and 90 provides a predetermined bit of an output A respectively labeled $A_0$, $A_1$, $A_2$ and $A_3$. As illustrated, bit $A_0$ is the least significant bit of output number A.

In operation, adders 40–43 function to calculate an output R' which is either the numerical sum of (R+N) or the numerical difference of (R−N) depending upon both the sign of the number N and the value of the increment/decrement control signal. If the Inc/Dec control signal has a logic zero value, an increment function is programmed, and if the Inc/Dec control signal has a logic one value, a decrement function is programmed. For the purpose of illustration, assume that an increment is initially programmed by the increment/decrement control signal. The output of adders 40–43 will be a sum value provided the sign bit S is a logic zero. Each bit of the resulting sum is immediately coupled to multiplexer circuit 22. Simultaneously, the sum calculated by full adders 40–43 is coupled to the A inputs of full adders 65–68 which calculates an output sum labeled "W". The W output sum represents the R' sum offset by the modulo value. Simultaneously, each of the rank ordered plurality of interstage carry bits generated by full adders 40–43 is coupled to an input of a respective one of AND gates 51–54.

Figure 4:
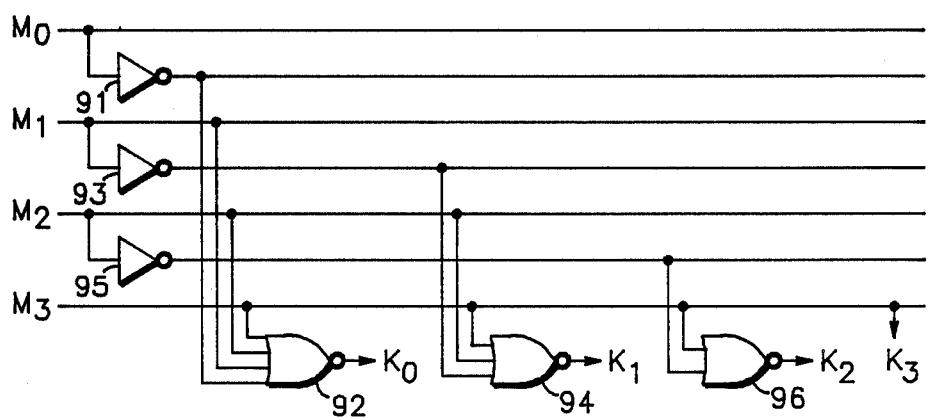
FIG. 4 illustrates in partial schematic form a preferred form of the decoder of FIG. 2.

Shown in FIG. 4 is one of many possible embodiments of decoder 27 which provides the rank ordered plurality of modulo control signals $K_0$ thru $K_3$ coupled to modulo/carry control circuits 25 and 29. Modulo bits $M_0$ thru $M_3$ are provided and define the value of a selected modulus minus one as discussed below. An inverter 91 has an input connected to modulo bit $M_0$ and an output connected to a first input of a NOR gate 92. NOR gate 92 has a second input connected to modulo bit $M_1$, a third input connected to modulo bit $M_2$ and a fourth input connected to modulo bit $M_3$. An output of NOR gate 92 provides control signal bit $K_0$. An input of an inverter 93 is connected to modulo bit $M_1$, and an output of inverter 93 is connected to a first input of a NOR gate 94. A second input of NOR gate 94 is connected to modulo bit $M_2$, and a third input of NOR gate 94 is connected to modulo bit $M_3$. An output of NOR gate 94 provides control signal bit $K_1$. An inverter 95 has an input connected to modulo bit $M_2$ and an output connected to a first input of a NOR gate 96. A second input of NOR gate 96 is connected to modulo bit $M_3$, and an output of NOR gate 96 provides control signal bit $K_2$. Control signal bit $K_3$ is provided as being exactly identical to modulo bit $M_3$.

In operation, modulo control signals $K_0$ thru $K_3$ are control signals which essentially control which interstage carry bit of each of adders 21 and 23 is examined for determining a wraparound condition. Use of interstage carry bits for detecting wraparound is made possible by requiring that lower boundaries be either zero or an integer multiple of a number having a predetermined base. In implementing decoder 27, control logic is minimized if the modulo input bits which define a selected modulo actually define the value of the modulus minus one. Therefore, the ranked ordered bits M0 thru M3 binarily define (M−1). This value simplifies the decoding due to the difference of exactly one between the highest valued number in the modulus and the modulo value. Referring to Table One below, a truth table for implementing modulo decoder 27 for applications up to modulo sixteen is shown.

TABLE ONE

| CARRY BIT B | Modulo Decoder | | | | | | | | MODULO ($M_X + 1$) |
|---|---|---|---|---|---|---|---|---|---|
| | M3 | M2 | M1 | M0 | K3 | K2 | K1 | K0 | |
| 0 | 0 | 0 | 0 | 1 | 0 | 0 | 0 | 1 | 2 |
| 1 | 0 | 0 | 1 | X | 0 | 0 | 1 | 0 | 3,4 |
| 2 | 0 | 1 | X | X | 0 | 1 | 0 | 0 | 5,6,7,8 |
| 3 | 1 | X | X | X | 1 | 0 | 0 | 0 | 9,10,11,12, 13,14,15,16 |

Although specific moduli are illustrated in Table One, it should be readily understood that the present invention may be used with any modulus size. The binarily rank ordered carry bits $C_0$ thru $C_3$ are shown corresponding to particular moduli which are defined by the bits $M_x$ plus one, where $M_x$ represents the k least significant modulo bits $M_0$, $M_1$, etc. For example, when the modulo input control word bits $M_0$ thru $M_3$ comprise a word in which the highest ordered bit having a logic one value is $M_1$, the possible modulo values which may be used are three and four depending upon the value of bit $M_0$. Similarly, when the modulo input control word bits $M_0$ thru $M_3$ comprise a word where the highest ordered bit having a binary one value is $M_2$, the possible modulo values are five, six, seven and eight. This is because the binary bit positions of $M_0$, $M_1$, $M_2$ and $M_3$ respectively represent one, two, four and eight. For example, if bits $M_3$, $M_2$, $M_1$ and $M_0$ are respectively 0011, the chosen modulus is (3+1) or four. If the modulus is four, carry bit $C_{11}$ of adder 21 and carry bit $C_{12}$ of adder 23 are selected by modulo/carry control circuits 25 and 29, respectively. In combination with the control bit S, $C_{11}$ and $C_{12}$ are decoded by control logic circuit 31 to provide a select control signal which selects the correct output via output multiplexer 22.

Control logic circuit 31 provides a select control signal output in accordance with the truth table of Table Two below,

TABLE TWO

| | | | Control Logic Circuit | |
|---|---|---|---|---|
| S | $C_{B2}$ | $C_{B1}$ | SELECT | COMMENTS |
| 0 | 0 | 0 | 1 (B) | NO WRAPAROUND OF UPPER BOUNDARY |
| 0 | X | 1 | 0 (A) | WRAPAROUND OF UPPER |

TABLE TWO-continued

| | | | Control Logic Circuit | |
|---|---|---|---|---|
| S | $C_{B2}$ | $C_{B1}$ | SELECT | COMMENTS |
| 0 | 1 | X | 0 (A) | BOUNDARY WRAPAROUND OF UPPER BOUNDARY |
| 1 | X | 0 | 0 (A) | WRAPAROUND OF LOWER BOUNDARY |
| 1 | X | 1 | 1 (B) | NO WRAPAROUND OF LOWER BOUNDARY |

When the S control signal is a logic zero, adder circuit 21 is approaching the upper boundary of the modulo range. When both carry control bits $C_{B1}$ and $C_{B2}$ are logic zeros no wraparound of the upper boundary occurs. The reason for needing to examine both carry control bits $C_{B1}$ and $C_{B2}$ is two-fold and may be better understood by referring to Table Two. Higher order carry bits of both adders 21 and 23 represent multiple moduli. This means that the range of possible values may be greater than the range of the actual modulo which is selected. For example, with respect to carry bit $C_{21}$, if modulo five is chosen and the resultant sum is six, no carry output bit for $C_{21}$ is generated to indicate that a wraparound occurred. Therefore, carry control bit $C_{B1}$ is a logic zero even though a wraparound did occur. However, after the modulus size of five is subtracted from six by adder 23 and the result does not overflow in a negative direction, carry control bit $C_{22}$ is a logic one and indicates that a wraparound of the upper boundary occurred. When subtracting the modulus value in adder 23, it should be remembered that a carry is the inverse of a borrow, and an interstage carry value of one indicates that a wraparound by the k LSBs of the upper boundary occurred. In summary, if either of carry control bits $C_{B1}$ or $C_{B2}$ has a logic one value during an addition as indicated by bit S, a wraparound condition exists and multiplexer 61 provides a select signal to multiplexer circuit 22 causing multiplexer 22 to provide the W wraparound output of adder 23 as the correct output A.

When the S control bit is a logic one, adder circuit 21 is approaching the lower boundary of the modulo range. Only the first carry bit $C_{B1}$ must be examined to determine existence of a wraparound. This is indicated by the "X" placed in the $C_{B2}$ column of Table Two indicating a do not care state. The reason for only having to examine the inter-stage carry bit of adder 21 is that the lower boundary is a known defined value regardless of which modulus value from Table One is chosen when a plurality of modulo values exist for each carry bit. As a result, the addition of the modulus value provided by adder 23 does not provide any additional information.

Since the bits $M_0$ thru $M_3$ represent the modulus value minus one for the reason stated above, adder 23 must be compensated so that the full range of the modulus is either added or subtracted from the R' output of adder 21. Therefore, when the modulus is being subtracted from R', the value being subtracted is actually $(M_x+1)$. The resulting value is $(-M_x-1)$. By coupling a carry input of zero to adder 65 when the modulus is being subtracted, the full value of $(M_x+1)$ is subtracted from the number R'. Exclusive OR gates 72-75 function in combination with the carry input bit of full adder 65 to form the two's complement of $(M_x+1)$ which is added to R' to accomplish the subtraction. The opposite is effected when $(M_x+1)$ is added to R'. A carry input of one is coupled to adder 65 so that the total value added to R' is $(M_x+1)$.

A brief example of an addition operation will further illustrate the operation of unit 20. Because an addition operation is illustrated, the INC/DEC control signal is a logic zero. Assume that the operation (5+3) modulo 6 is calculated. The correct answer is two. In this example, the interstage carry bits $C_{21}$ and $C_{22}$ of the three LSBs of the numbers R and N must be examined because the modulus six falls within the representation of $2^3$ or eight. The number R is five or 0101 in binary, the number N is three or 0011 in binary, and the number $M_x$ which is one less than the modulus is five or 0101 in binary. Since the sign bit $N_3$ of number N is zero and the INC/DEC control signal is zero, the S bit is zero. The R' output of adder 21 is equal to eight or 1000 in binary. The interstage carry bits $C_{31}$, $C_{21}$, $C_{11}$ and $C_{01}$ are 0111, respectively. The modulo control bits $K_3$, $K_2$, $K_1$ and $K_0$ are 0100, respectively, which means that the third inter-stage carry bits $C_{21}$ and $C_{22}$ are being examined. Because both bits $K_2$ and $C_{21}$ are a binary one, output modulo carry bit $C_{B1}$ is a binary one which indicates to multiplexer circuit 61 that a wraparound occurred and that the A terminals of multiplexer circuit 22 should be coupled to the output to provide the wraparound number W. In adder 23, the R' number 1000 is coupled to adder 23 at respective A inputs of full adders 65-68. The modulus value $(M_x+1)$ is subtracted from R' by coupling the two's complement value of six, 0110, which is 1010 to respective B inputs of full adders 65-68. The resulting W wraparound output of adder 23 is 0010, or two, which is coupled to multiplexer 22. Because carry control bit $C_{B1}$ is one and the S bit is zero indicating addition, the number W is outputted in accordance with Table Two. Although not relevant due to the fact that $C_{B1}$ is one, the value of $C_{B2}$ is zero. The value of $C_{B2}$ was determined by the fact that $K_2$ was the only modulo control bit which had a binary one value and the inter-stage carry bit $C_{22}$ of adder 23 is a logic zero. Therefore, the output of OR gate 85 is a logic zero. It should be noted that when wraparound of the upper boundary does not occur, both $C_{B1}$ and $C_{B2}$ of adders 21 and 23, respectively, are a logic zero.

By now it should be clear that a modulo M arithmetic unit for providing sums and differences of variable numbers in an arbitrary modulus has been provided. The invention is not limited by way of example to any particular bit size. Further, the present invention may be modified so that selected ones of the individual circuits may be implemented with differing bit sizes provided the associated circuitry is properly sized. Any word size may be implemented by appropriate decoding techniques and the amount of circuitry required for the modulo arithmetic unit is exactly linear with bit size. It should be obvious that the present invention is not limited to a particular type of arithmetic and is illustrated in binary arithmetic by way of example only. For example, other arithmetic types such as BCD may be readily used in conjunction with the present invention. Neither is the present invention restricted to a particular type of number representation such as integer arithmetic. The present invention may be practiced with either signed or unsigned numbers. Other number representations such as floating point numbers may be used. Further, many ways exist for implementing specific control portions of the present invention. Conventional PLAs or ROMs may also be used for implementing the portions of the present invention. Conventional carry look-ahead techniques may be used to improve speed and minimize logic in adder circuits 21 and 23 and modulo decoder circuit 27.

In the illustrated form, it should also be noted that the restrictions regarding the ability to detect only single wraparounds and the limitation of permissible lower boundaries is not restrictive for the majority of practical applications. In general, calculations of addresses for creating queues, circular buffers and FIFOs in memory do not have more than one wraparound because of the nature of accesses to the data structure. For example, FIFOs operate on the basis of inserting and removing several data items at a time. The modulo size of a FIFO is typically much larger than the size of each insertion or removal from the FIFO data structure. It should be noted that for some large data processors, data is inserted or removed from memory several words at a time. For typical modulo sizes, modulo wraparounds never occur more than once per instruction. This is another example where allowing offsets greater than one is advantageous for modulo arithmetic.

Waveform generation is also a common example of the use of modulo arithmetic where arbitrary frequency signals are generated based upon the use of modulo addressing thru one cycle of a stored waveform. The modulus M is equal to the length of storage for one cycle of the waveform. The offset N is the angular velocity of the waveform to be generated. To generate fractions of one complete cycle per output value, the offset N must be less than the modulus M. Therefore, the previously stated restriction that the absolute value of N must be less than or equal to the modulus value is not a problem at all in waveform generation applications. However, the flexibility gained by the ability to perform modulo addressing and arithmetic calculations with an arbitrary offset and modulo value is extremely valuable in signal processing applications.

What is claimed is:

1. A modulo arithmetic unit for providing an output number as a sum of first and second input numbers, said first input number and output number being within a predetermined range having an upper and a lower boundary relative to a selected one of a plurality of predetermined modulus numbers, said second number being positive and having an absolute value less than or equal to the selected modulus number, and said sum approaching or wrapping around the upper boundary, comprising:

first adder means having inputs for selectively receiving the first and second input numbers and adding the first and second input numbers, said first adder means providing a sum number and at least one carry bit of a first carry signal, said sum number representing the linear arithmetic sum of the first and second input numbers;

second adder means having inputs for selectively receiving the first sum number and a range number related to the selected modulus number and subtracting the range number from the first sum number, said second adder means providing a difference number and at least one bit of a second carry signal, said difference number representing the modulo arithmetic sum of the first and second input numbers; and control means coupled to both the first and second adder means, for selectively receiving the first and second carry signals, and selectively detecting, in response to the selected modulus number and the first and second carry signals, a wraparound of the upper boundary resulting from the sum of the first and second input numbers to select one of the linear arithmetic sum or the modulo arithmetic sum as the output number.

2. The modulo arithmetic unit of claim 1 wherein said control means further comprise:

decoding means for receiving the range number and providing a modulo control signal in response thereto;

first logic means coupled to the first adder means for providing a first carry control bit in response to both the first carry signal and the modulo control signal;

second logic means coupled to the second adder means for providing a second carry control bit in response to both the second carry signal and the modulo control signal;

third logic means coupled to the first and second logic means for providing a select control signal in response to the first and second carry control bits; and means for outputting one of the linear arthmetic sum or the modulo arithmetic sum in response to the select control signal.

3. The modulo arithmetic unit of claim 2 wherein said first and second logic means each further comprises:

a plurality of AND logic gates, each of which logically ANDs a predetermined bit of either the first or second carry signal and a predetermined bit of the modulo control signal; and an OR logic gate coupled to the plurality of AND logic gates for providing either the first or second carry control bit.

4. A modulo arithmetic unit for providing an output number as a sum of first and second input numbers, said first input number and output number being within a predetermined range having an upper and a lower boundary relative to a selected one of a plurality of predetermined modulus numbers, said second input number being negative and having an absolute value less than or equal to the selected modulus number, and said sum approaching or wrapping around the lower boundary, comprising:

first adder means having inputs for selectively receiving the first and second input numbers, said first adder means providing a sum number and at least one carry bit of a carry signal, said sum number representing the linear arithmetic sum of the first and second input numbers;

second adder means having inputs for selectively receiving the first sum number and a range number related to the selected modulus number and adding the range number to the sum number, said second adder means providing a difference number representing the modulo arithmetic sum of the first and second input numbers; and control means coupled to both the first and second adder means, for selectively receiving the carry signal, and selectively detecting, in response to the selected modulus number and the carry signal, a wraparound of the lower boundary resulting from the sum of the first and second input numbers to select one of the linear arithmetic sum or the modulo arithmetic sum as the output number.

5. The modulo arithmetic unit of claim 4 wherein said control means further comprise:

decoding means for receiving the range number and providing a modulo control signal in response thereto;

first logic means coupled to the first adder means for providing a carry control bit in response to both the carry signal and the modulo control signal;

second logic means coupled to the first logic means for providing a select control signal in response to the carry control bit; and means for outputting one of the linear arithmetic sum or the modulo arithmetic sum in response to the select control signal.

6. The modulo arithmetic unit of claim 5 wherein said first logic means further comprise:

a plurality of AND logic gates, each of which logically ANDs a predetermined bit of the carry signal and a predetermined bit of the modulo control signal; and an OR logic gate coupled to the plurality of AND logic gates for providing the carry control bit.

7. A modulo arithmetic unit for providing an output number as difference of first and second input numbers, said first input number and output number being within a predetermined range having an upper and a lower boundary relative to a selected one of a plurality of predetermined modulus numbers, said second input number being negative and having an absolute value less than or equal to the selected modulus number, and said difference approaching or wrapping around the upper boundary, comprising:

first arithmetic means having inputs for selectively receiving the first and second input numbers and subtracting the second input number from the first input number, said first arithmetic means providing a first difference number and at least one carry bit of a first carry signal, said first difference number representing the linear arithmetic difference of the first and second input numbers;

second arithmetic means having inputs for selectively receiving the first difference number and a range number related to the selected modulus number and subtracting the range number from the first difference number, said second arithmetic means providing a second difference number and at least one bit of a second carry signal, said second difference number representing the modulo arithmetic difference of the first and second input numbers; and control means coupled to both the first and second arithmetic means, for selectively receiving the first and second carry signals, and selectively detecting, in response to the selected modulus number and the first and second carry signals, a wraparound of the upper boundary resulting from the difference of the first and second input numbers to detect one of the first or second difference numbers as the output number.

8. The modulo arithmetic unit of claim 7 wherein said control means further comprise:

decoding means for receiving the range number and providing a modulo control signal in response thereto;

first logic means coupled to the first arithmetic means for providing a first carry control bit in response to both the first carry signal and the modulo control signal;

second logic means coupled to the second arithmetic means for providing a second carry control bit in response to both the second carry signal and the modulo control signal;

third logic means coupled to the first and second logic means for providing a select control signal in response to the first and second carry control bits; and means for outputting one of the linear arithmetic difference or the modulo arithmetic difference in response to the select control signal.

9. The modulo arithmetic unit of claim 8 wherein said first and second logic means each further comprises:

a plurality of AND logic gates, each of which logically ANDs a predetermined bit of either the first or second carry signal and a predetermined bit of the modulo control signal; and an OR logic gate coupled to the plurality of AND logic gates for providing either the first or second carry control bit.

10. A modulo arithmetic unit for providing an output number as a difference of first and second input numbers, said first input number and ouput number being within a predetermined range having an upper and a lower boundary relative to a selected one of a plurality of predetermined modulus numbers, said second input number being positive and having an absolute value less than or equal to the selected modulus number, and said difference approaching or wrapping around the lower boundary, comprising:

first arithmetic means having inputs for selectively receiving the first and second input numbers and subtracting the second input number from the first input number, said first arithmetic means providing a first difference number and at least one carry bit of a first carry signal, said first difference number representing the linear arithmetic difference of the first and second input numbers;

second arithmetic means having inputs for selectively receiving the first difference number and a range number related to the selected modulus number and adding the modulus number to the first difference number, said second arithmetic means providing a second difference number representing the modulo arithmetic difference of the first and second input numbers; and control means coupled to both the first and second arithmetic means, for selectively receiving the first carry signal, and selectively detecting, in response to the selected modulus number and the first carry signal, a wraparound of the lower boundary resulting from the difference of the first and second input numbers to select one of the first or second difference numbers as the output number.

11. The modulo arithmetic unit of claim 10 wherein said control means further comprise:

decoding means for receiving the range number and providing a modulo control signal in response thereto;

first logic means coupled to the firt arithmetic means for providing a carry control bit in response to both the carry signal and the modulo control signal;

second logic means coupled to the first logic means for providing a select control signal in response to the carry control bit; and means for outputting one of the first or second difference numbers in response to the select control signal.

12. The modulo arithmetic unit of claim 11 wherein said first logic means further comprise:
- a plurality of AND logic gates, each of which logically ANDs a predetermined bit of the carry signal and a predetermined bit of the modulo control signal; and
- an OR logic gate coupled to the plurality of AND logic gates for providing the carry control bit.

13. In a system for providing an output number as a sum or difference of first and second input numbers in modulo arithmetic, the first input number and output number being within a predetermined range having an upper and a lower boundary relative to a selected one of a plurality of predetermined modulus numbers, the second number being either positive or negative and having an absolute value less than or equal to the selected modulus number, a method for providing the output number comprising the steps of:
- providing first means for selectively adding or subtracting the second number to or from the first number, respectively, in response to an arithmetic operation control signal;
- providing second means for providing at least one first carry signal and a first intermediate number in response to the selective adding or subtracting, said first intermediate number representing the linear aritmetic sum or difference of the first and second input numbers;
- providing third means for selectively adding or subtracting the selected modulus number to or from, respectively, the first intermediate number to provide a second intermediate number and at least one second carry signal, said second intermediate number representing the modulo arithmetic sum or difference of the first and second input numbers; and
- providing fourth means for selectively detecting, in response to a predetermined combination of the selected modulus number and the first and second carry signals, whether the addition or subtraction of the first and second input numbers resulted in a wraparound of either the upper or lower boundary and providing one of the first or second intermediate numbers as the output number in response thereto.

14. A modulo arithmetic unit comprising:
- first means for summing first and second numbers which may have an arbitrary absolute value integer difference greater than one, said first and second numbers each being either a positive or negative number and each number being within a predetermined range having an upper and a lower boundary relative to a selected one of a plurality of predetermined modulus numbers, said first means generating both a linear and a modulo arithmetic sum of the first and second numbers; and
- second means coupled to the first means, said second means using at least one carry bit of the linear arithmetic sum generation to select one of either the linear sum or the modulo arithmetic sum to output as an output number.

* * * * *